Figure 1:
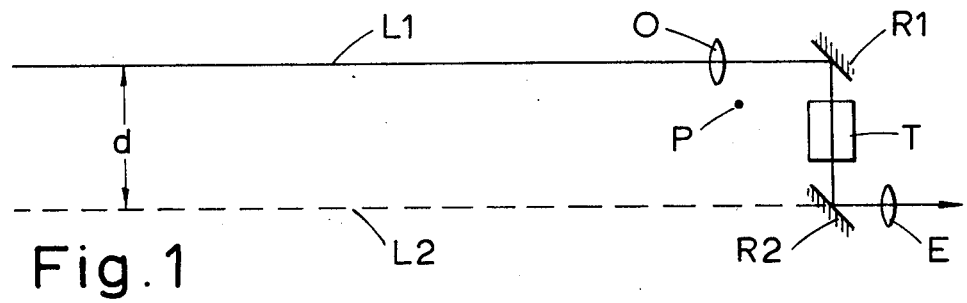

United States Patent [19]

Clarke

[11] 4,116,528

[45] Sep. 26, 1978

[54] OPTICAL VIEWING DEVICE OF THE PERISCOPE TYPE WITH ROTATING MEANS FOR FOCUSSING

[75] Inventor: John A. Clarke, Carshalton, England

[73] Assignee: U.S. Philips Corporation, New York, N.Y.

[21] Appl. No.: 672,250

[22] Filed: Mar. 31, 1976

[30] Foreign Application Priority Data

Apr. 10, 1975 [GB] United Kingdom ............... 14765/75

[51] Int. Cl.² ..................... G02B 23/08; G02B 23/12; G02B 7/04
[52] U.S. Cl. ......................................... 350/52; 350/47
[58] Field of Search ...................... 350/52, 25, 26, 46, 350/47, 301, 22, 72, 6; 356/17

[56] References Cited

U.S. PATENT DOCUMENTS

| 1,316,438 | 9/1919 | French ..................................... 350/26 |
| 1,520,245 | 12/1924 | Humbrecht ............................. 350/26 |
| 1,610,553 | 12/1926 | Jones ....................................... 350/72 |
| 3,846,007 | 11/1974 | Flogaus et al. ..................... 350/26 X |

FOREIGN PATENT DOCUMENTS

| 1,182,853 | 12/1964 | Fed. Rep. of Germany ............. 350/52 |
| 2,004,341 | 12/1970 | Fed. Rep. of Germany ............. 350/52 |

Primary Examiner—Jon W. Henry
Attorney, Agent, or Firm—Frank R. Trifari; Simon L. Cohen

[57] ABSTRACT

A head-worn viewing device for alleviating night blindness includes an image intensifier tube between periscopic reflectors with an objective lens in front of the upper reflector and an eyepiece lens behind the lower reflector. The objective and upper reflector are mounted for rotation together about a pivot so that, for short viewing distances, a continuous adjustment is provided which will refocuss the objective at the front plane of the intensifier tube and compensate for the parallax of the periscopic reflectors.

7 Claims, 4 Drawing Figures

OPTICAL VIEWING DEVICE OF THE PERISCOPE TYPE WITH ROTATING MEANS FOR FOCUSSING

The invention relates to an optical viewing device of the type including an objective, a periscopic reflector system, and an eyepiece lens.

If such a device is to be used for viewing objects at short distances then two adjustments become desirable. Firstly it is desirable to refocus the objective; for example, for a 50 mm focal length objective it becomes desirable to refocus to obtain a sharp image when looking at objects less than approximately 3 meters away. Secondly, the parallax due to the periscopic reflector system will mean that the picture presented to the eye by the viewing device is significantly different from the picture which would be expected from the line of sight through the eyepiece lens when looking at objects less than approximately 3 meters away; and so it becomes desirable to compensate for this parallax.

The object of this invention is to provide an optical viewing device of the type described in the opening paragraph with adjustment means which is adapted to provide both the the adjustments described in the previous pargraph.

According to the invention an optical viewing device including a fixed focal length objective, a periscopic reflector system, and an eyepiece lens is therefore provided with adjustment means adapted to rotate the objective, or part of the periscopic reflector system, or both to a required position on a predetermined are so that, for a predetermined range of short viewing distances, an image formed by the objective of a scene to be viewed is refocussed at a fixed image plane, the axis of rotation being located so that within the range of adjustment the optical axis through the objective to the scene to be viewed is tilted towards the line of sight through the eyepiece lens.

According to a further feature of the invention, there is provided a device as described in the previous paragraph in which the optical axis from the scene to be viewed passes through the objective, then to a first reflector of the periscopic system, then to a second reflector of the periscopic system and then to the eyepiece lens, and in which the objective and the first reflector are mounted on a common frame so as to be rotated together by the adjustment means. In this case the adjustment means preferably includes a cam which bears against the common frame.

It has been proposed to use image intensifiers to alleviate the problem of night blindness. A viewing device of the type described in the opening paragraph, and including an image intensifier within the periscopic reflector system, will have the advantage that the weight of the image intensifier is close to the user's head when the device is worn by the user. Both the adjustments of refocussing and parallax compensation will be desirable for viewing objects at short distances with such a device.

According to a further feature of the invention a viewing device which includes an image intensifier, the image intensifier is therefore located between said first and said second reflectors, said fixed image plane being located at the front of the image intensifier. In such a device an eyepiece arrangement including said eyepiece lens may be provided to enable the rear of the image intensifier to be viewed by a person with both his eyes. This eyepiece arrangement may include a further eyepiece lens. Furthermore, such a device can be provided with means enabling the device to be worn on a person's head.

Figure 2:
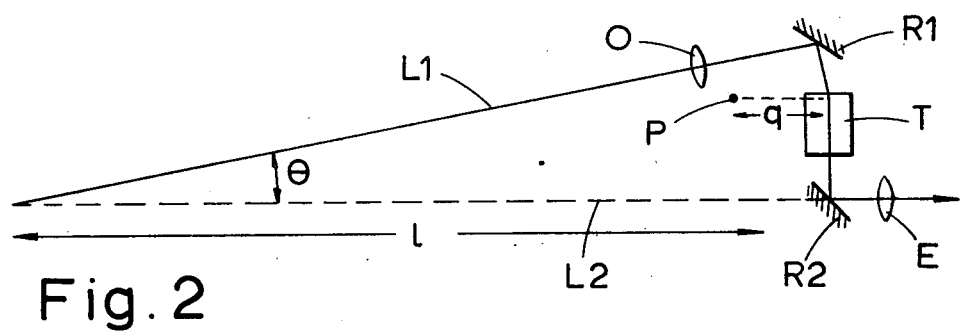
Figure 3:
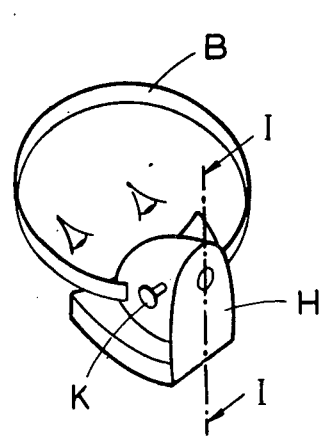
Figure 4:
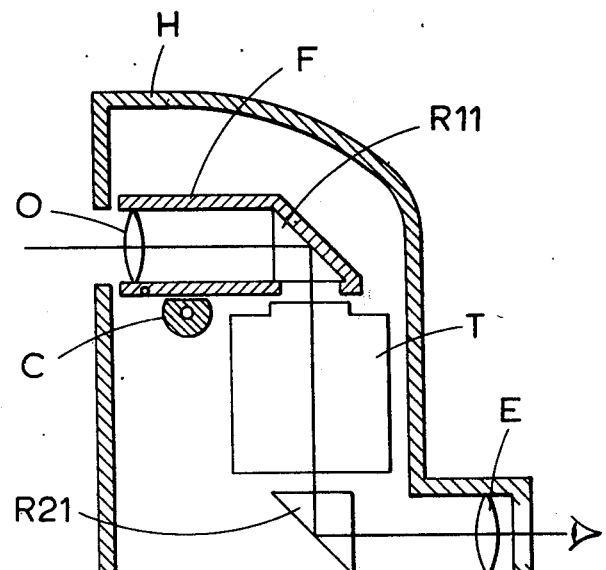

The invention will now be described in more detail with reference to the accompanying drawing, in which:

FIG. 1 and 2 show a viewing device according to the invention in schematic form and illustrate the principle of its operation, FIG. 3 shows a viewing device according to the invention suitable to be worn on a person's head, and FIG. 4 shows a section on the line I—I of the device shown in FIG. 3.

Referring now to FIG. 1, there is shown a periscopic arrangement of an objective lens O, first mirror R1, image intensifier tube T, second mirror R2 and eyepiece lens E. The objective O has a fixed focal length $f$, and so when the optical path length between the objective O and the input end of the image intensifier tube T equals $f$ then the objective O forms a real image of a scene to be viewed at infinity which is focussed at the fixed image plane formed by the input end of the tube T. An intensified and erected image is formed by the tube T at its output end which is viewed by the eyepiece lens E. The optical axis $L_1$ through the objective O to the scene to be viewed at infinity and the line of sight $L_2$ through the eyepiece lens E are parallel and separated by the distance $d$ between the periscopically arranged mirrors R1 and R2.

Adjustment means (shown in and to be described with reference to FIG. 4) are provided adapted to rotate the objective O and the first mirror R1 together on a predetermined arc about an axis of rotation P so as to vary the optical path length between the mirror R1 and the input image plane of the tube T and hence between the objective O and the input image plane of the tube T.

Thus, for a predetermined range of short viewing distances, the image formed by the objective O of a scene to be viewed can be refocussed at the fixed image plane formed by the input end of the tube T. The axis of rotation P is located so that within the range of adjustment the optical axis $L_1$ is tilted towards the line of sight $L_2$ thus compensating for the parallax due to the separation between the mirrors R1 and R2.

Approximately full compensation for parallax can be obtained continuously over a range of refocussing adjustments as will be appreciated from the following analysis with reference to FIG. 2.

When the viewing device is focussed for an object to be viewed at a distance l, then for full parallax compensation the axis $L_1$ and the line of sight $L_2$ should converge as in FIG. 2. The angle $\theta$ between the axes is $d/l$ randians. The required change in the distance from the objective lens O to the image tube T when refocussing from infinity to distance l is $f^2 / (l - f)$ where $f$ is the focal length of the lens.

Let the axis of rotation P lie in the plane of the image plane at the front of the tube T and at a distance $q$ from the centre line of that image plane. When the objective lens O and mirror $R_1$ are tilted as one unit, the distance from mirror $R_1$ to image tube T increases by $q\theta$ or $qd/l$. Equating this with the required change in focussing distance calculated above gives the expression:

$$q = (lf^2)/(d(l-f)) \approx (f^2/d) \text{ if } l >> f$$

i.e. The ideal position of the axis of rotation is independent of l if $l >> f$. For example, if the focal length $f$ of the objective lens O is 50 mm and the separation $d$ between the mirrors $R_1$ and $R_2$ is 80 mm, then the distance $q$ should be approximately 30 mm. There will then be approximately full parallax compensation continuously over a range of refocussing adjustment for viewing objects at distances l between 3 m and 250 mm.

If the axis of rotation P lies close to the fixed image plane at the front of the tube T, then there is the advantage that the optical axis through the objective lens O to the fixed image plane will remain close to the center of that image plane as the lens O and mirror $R_1$ are rotated over the range of adjustment.

A realization of the viewing device shown schematically in FIGS. 1 and 2, suitable to be worn on a person's head, will now be described with reference to FIG. 3 and 4. The objective lens O and a prism $R_{11}$, which serves as a reflector instead of the mirror R1 shown in FIG. 1 and 2, are mounted on a common frame F. The axis P about which the objective O and prism $R_{11}$ are rotated as one unit passes through the frame F. The adjustment means adapted to rotate the objective O and prism $R_{11}$ includes a cam C which bears against the frame F. The objective O, prism $R_{11}$ and cam C are located in a housing H together with the image intensifier tube T, a prism $R_{21}$ which serves as a reflector instead of the mirror $R_2$ shown in FIGS. 1 and 2, and an eyepiece arrangement including the eyepiece lens E. The cam C can be manually rotated by a knob K outside the housing H. The eyepiece arrangement is such as to enable the rear of the image intensifier tube T to be viewed by a person with both his eyes, and the eyepiece lens E can be one of a pair of eyepiece lenses provided for this purpose. A headband B is attached to the housing H enabling the viewing device to be worn on a person's head as a hands free arrangement.

Some possible variations from the above-described viewing device within the scope of the invention will now be discussed.

In the arrangement as above-described where the objective lens O is in front of the mirror R1, it would be possible to obtain the required refocussing with a degree of parallax compensation by rotating either the objective O or the mirror R1 alone. However the axis of rotation would be displaced from the plane of the fixed image plane at the front of the tube T, which would provide a less convenient mechanical arrangement for a realization of a viewing device to be worn on a person's head and would also increase the deviation of the optical axis from the objective O to the tube T from the center of the fixed image plane over the range of adjustment.

The refocussing and parallax compensating arrangement may be useful in viewing devices having a periscopic reflector system but not including an image intensifier tube, for example camera view finders and other devices for sighting or alignment. Particularly in such devices, it may be convenient to locate the objective lens O behind the mirror $R_1$ instead of in front of it. If this is done, then refocussing with parallax compensation can be achieved by rotating the mirror $R_1$ and the objective O together, or by rotating the objective O alone.

What is claimed is:

1. An optical viewing device comprising a fixed focal length objective, a periscopic reflector system, an eyepiece lens, said objective and said periscopic reflector system comprising a focussing and light redirecting system, and means for rotating at least one member of said focussing and light redirecting system along an arc sufficient to alter the optical path between said objective and said eyepiece lens for focussing said optical viewing device on a selected object within a predetermined range of short viewing distances and for correspondingly tilting the optical axis through the objective toward a line of sight between said eyepiece lens and said selected object.

2. A device as claimed in claim 1, wherein the optical axis from the scene to be viewed passes through the objective, then to a first reflector of the periscopic system, then to a second reflector of the periscopic system and then to the eyepiece lens, and in which the objective and said first reflector are mounted on a common frame so as to be rotated together by said adjustment means.

3. A device as claimed in claim 2, wherein said adjustment means includes a cam which bears against said common frame.

4. A device as claimed in claim 2, wherein an image intensifier is located between said first and said second reflectors, said fixed image plane being located at the front of the image intensifier.

5. A device as claimed in claim 4, wherein said eyepiece lens is included in an eyepiece arrangement so as to enable the rear of the image intensifier to be viewed by a person with both his eyes.

6. A device as claimed in claim 5, wherein the eyepiece arrangement includes a further eyepiece lens.

7. A device as claimed in claim, 4 provided with means enabling the device to be worn on a person's head.

* * * * *